United States Patent
Jastram et al.

(10) Patent No.: US 8,463,316 B2
(45) Date of Patent: Jun. 11, 2013

(54) COMMUNICATION DEVICE WITH A MULTI-FUNCTIONAL CONTROL

(75) Inventors: Robert Jastram, Asheville, NC (US); Willem Deleus, Boortmeerbeek (BE); James Teel, Lynchburg, VA (US)

(73) Assignee: Harris Corporation, Melbourne, FL (US)

( * ) Notice: Subject to any disclaimer, the term of this patent is extended or adjusted under 35 U.S.C. 154(b) by 742 days.

(21) Appl. No.: 12/706,843

(22) Filed: Feb. 17, 2010

(65) Prior Publication Data

US 2011/0201379 A1    Aug. 18, 2011

(51) Int. Cl.
*H04M 1/00* (2006.01)

(52) U.S. Cl.
USPC ........ 455/550.1; 455/556; 455/564; 455/518; 455/90.2; 345/173

(58) Field of Classification Search
None
See application file for complete search history.

(56) References Cited

U.S. PATENT DOCUMENTS

| | | | |
|---|---|---|---|
| 4,131,033 A | | 12/1978 | Wright et al. |
| 5,270,689 A | | 12/1993 | Hermann |
| 5,663,747 A | | 9/1997 | Shulman |
| 6,097,964 A | * | 8/2000 | Nuovo et al. ................. 455/566 |
| 7,965,231 B2 | * | 6/2011 | Kirmuss et al. .......... 342/357.34 |
| 2002/0098874 A1 | * | 7/2002 | Zirul et al. ..................... 455/564 |
| 2007/0155415 A1 | * | 7/2007 | Sheehy et al. ................ 455/518 |
| 2007/0270179 A1 | * | 11/2007 | Lee et al. ................... 455/550.1 |
| 2008/0078661 A1 | | 4/2008 | Matsumoto et al. |
| 2008/0088602 A1 | * | 4/2008 | Hotelling ....................... 345/173 |
| 2009/0033552 A1 | | 2/2009 | Kirmuss et al. |
| 2010/0291883 A1 | * | 11/2010 | Lim et al. ..................... 455/90.2 |
| 2011/0201379 A1 | | 8/2011 | Jastram et al. |
| 2011/0281533 A1 | | 11/2011 | Deleus et al. |

FOREIGN PATENT DOCUMENTS

| | | |
|---|---|---|
| DE | 19906386 A1 * | 8/2000 |
| EP | 1 569 073 A2 | 8/2005 |
| WO | 2010020986 A2 | 2/2010 |

OTHER PUBLICATIONS

International Search Report mailed Aug. 10, 2011, Application Serial No. PCT/US2011/035098, in the name of Harris Corporation.
Deleus, W., U.S. Appl. No. 12/777,568, filed May 11, 2010, entitled "Electronic Device With a Multi-Functional Control".

* cited by examiner

*Primary Examiner* — Fayyaz Alam
*Assistant Examiner* — Mohammed Rachedine
(74) *Attorney, Agent, or Firm* — Fox Rothschild, LLP; Robert J. Sacco

(57) ABSTRACT

Systems (100) and methods (400) for controlling functions of a Radio Transceiver (206, 208). At least one function is controlled in response to: a depression of a center of an elongated roller of a control element (102, 300); a depression of a first peripheral edge portion (FPEP) of the elongated roller (302) for a first period of time; a depression of a second peripheral edge portion (SPEP) of the elongated roller for a second period of time; a rotation of the elongated roller around a central axis thereof; a depression of the FPEP (352) for a third period of time that is longer than the first period of time; and/or a depression of a SPEP (354) for a fourth period of time that is longer than the second period of time.

24 Claims, 8 Drawing Sheets

COMMUNICATION DEVICE WITH A MULTI-FUNCTIONAL CONTROL

BACKGROUND OF THE INVENTION

1. Statement of the Technical Field

The inventive arrangements relate to communication systems, and more particularly to systems and methods for controlling a radio transceiver using a multi-functional elongated roller.

2. Description of the Related Art

There are various communication networks known in the art. Such communication networks include a Land Mobile Radio (LMR) network, a Wideband Code Division Multiple Access (WCDMA) based network, a Code Division Multiple Access (CDMA) based network, a Wireless Local Area Network (WLAN), an Enhanced Data rates for GSM Evolution (EDGE) based network and a Long Term Evolution (LTE) based network. Each of these communication networks comprises a plurality of communication devices and network equipment configured to facilitate communications between the communication devices. Each communication network often provides a group call service to service users. The group call service is a service by which a service user (e.g., first responder) is able to simultaneously talk to other service users (e.g., other first responders) associated with a particular talk group or social media profile. The group call service can be implemented by a Push-To-Talk (PTT) group call service. The PTT group call service is an instant service by which the PTT service user is able to immediately talk to other PTT service users of a particular talk group or social media profile by pushing a PTT button of a communication device In some scenarios, the communication devices include land mobile radios. Each of the radios typically comprises a plurality of rotary knobs and a PTT button for controlling a radio transceiver thereof. The rotary knobs are disposed on top panels of the radios. A first one of the rotary knobs is provided for selecting an individual or a talk group to which a PTT call is to be made. A second one of the rotary knobs is provided for controlling an audio volume of a radio. The PTT button is disposed on a side panel of the radio. Consequently, a user of the radio is unable to use one finger alone for controlling the radio receiver of the radio. Also, two hands are undesirably required to hold the radio and change functional settings of the radio through the plurality of rotary knobs.

SUMMARY OF THE INVENTION

Embodiments of the present invention concern methods for controlling a radio transceiver. The methods generally involve controlling a first function of the radio transceiver in response to a depression of a center of an elongated roller of a control element. A second function of the radio transceiver is controlled in response to the depression of a first peripheral edge portion of the elongated roller for a first period of time (e.g., less than two seconds). A third function of the radio transceiver is controlled in response to a depression of a second peripheral edge portion of the elongated roller for a second period of time (e.g., less than two seconds). The second peripheral edge portion is opposed from the first peripheral edge portion. A fourth function of the radio transceiver is controlled in response to the rotation of the elongated roller around a central axis thereof. A fifth function of the radio transceiver is controlled in response to the depression of the first peripheral edge portion for a third period of time (e.g., greater than two seconds) that is longer than the first period of time. A sixth function of the radio transceiver is controlled in response to the depression of the second peripheral edge portion for a fourth period of time (e.g., greater than two seconds) that is longer than the second period of time. Each of the first, second, third, fourth, fifth and sixth functions can include, but is not limited to, an audio volume function, a channel selection function, a mute function, a brightness selection function, an "on/off" function, a play function, a rewind function, a fast forward function, a pause function, a channel recall function, a camera function, a talk group selection function, a media profile selection function, an individual call function, a group call function, an emergency call function, a map selection function, a priority selection function, a user interface selection function and/or a PTT function.

Embodiments of the present invention also concern apparatus and systems for controlling a device. The device can include, but is not limited to, a radio, a mobile phone, a cellular phone, a personal digital assistant, a global positioning device, a personal computer, a television, a vehicular communication device and accessories that work together with these devices. Notably, the apparatus and systems implement the above described method. As such, the apparatus and systems include a control element and at least one controller. The control element comprises an elongated roller. The controller is configured to control the first function of the device in response to the depression of the center of the elongated roller. The controller is also configured to control the second function of the device in response to the depression of the first peripheral edge portion of the elongated roller for the first period of time. The controller is further configured to control the third function of the device in response to the depression of the second peripheral edge portion of the elongated roller for the second period of time. The fourth function of the device is controlled by the controller in response to a rotation of the elongated roller around it's central axis. The fifth function of the device is controlled by the controller in response to the depression of the first peripheral edge portion for the third period of time that is longer than the first period of time. The sixth function of the device is controlled by the controller in response to the depression of the second peripheral edge portion for the third period of time that is longer than the second period of time.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 1:
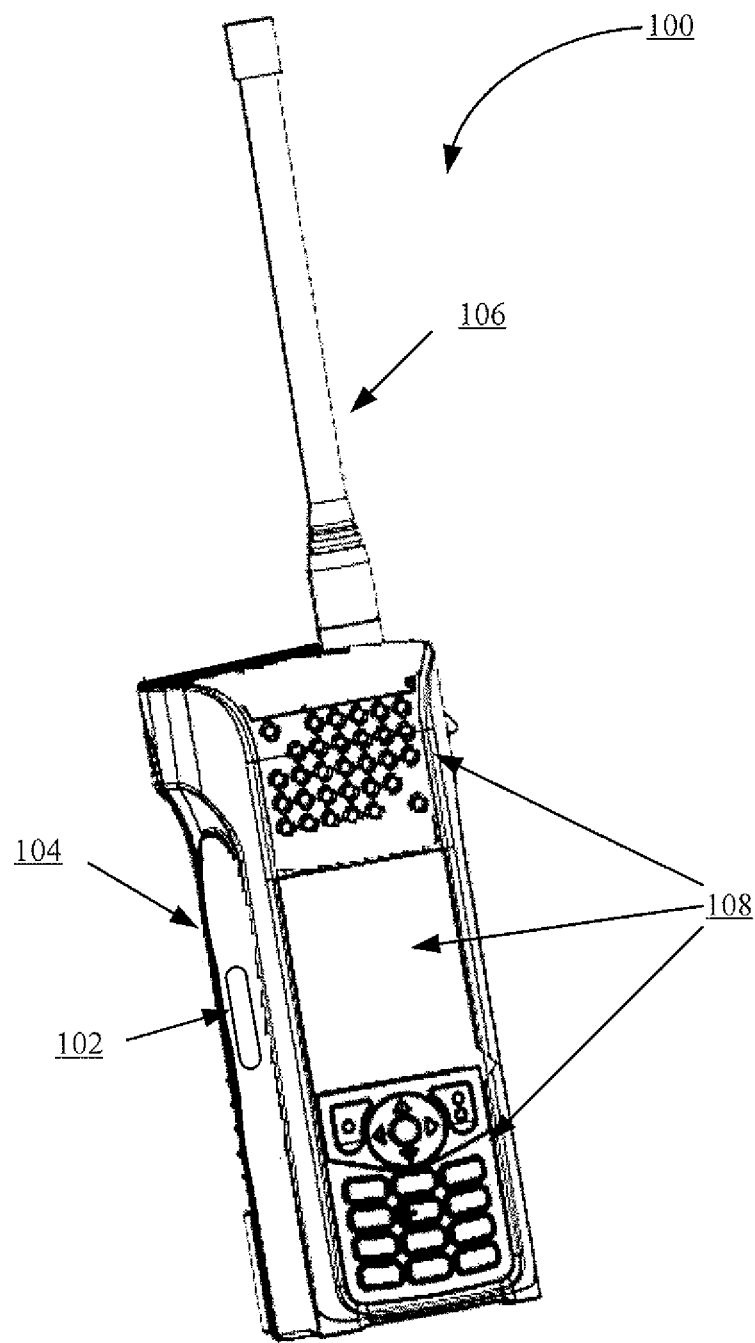
FIG. 1 is a schematic illustration of an exemplary communication device that is useful for understanding the present invention.

Referring now to FIG. 1, there is provided a block diagram of an exemplary communication device 100 that implements one or more method embodiments of the present invention. Although the communication device 100 is shown in FIG. 1 to be a portable land mobile radio, embodiments of the present invention are not limited in this regard. For example, the communication device 100 can alternatively include, but is not limited to, a mobile phone, a cellular phone, a personal digital assistant, a global positioning device, a personal computer, a television, a vehicular communication device or other communication device. In each of these scenarios, the communication device 100 generally includes a housing 104, an antenna 106 and internal circuitry (not shown in FIG. 1). The communication device 100 also includes a control element (e.g., a PTT button or switch) 102 and other user interface components 108.

In some embodiments, the communication device 100 shown in FIG. 1 is generally configured to facilitate the provision of data communication services, individual call services or group call services to a service user. A data communication service is generally a service by which a service user is able to send and/or receive data messages. An individual call service is generally a service by which a service user is able to talk with one other service user. The group call service is a service by which a service user is able to talk to one or more service users associated with a particular talk group or social media profile. The group call service can be implemented by a PTT group call service. The PTT group call service is an instant service by which the PTT service user is able to immediately talk to other PTT service users of a particular talk group or social media profile by actuating the control element 102 of the communication device 100.

Notably, the communication device 100 is configured to operate in a Land Mobile Radio (LMR) based communication system, a Global Positioning System (GPS), a cellular based communication system or other wireless communication system. The cellular based system can include, but is not limited to, a second generation (2G) compatible system and/or a third generation (3G) compatible system and/or a fourth generation (4G) compatible system. The phrase "second generation (2G)", as used herein, refers to second-generation wireless telephone technology. The phrase "third generation (3G)", as used herein, refers to third-generation wireless telephone technology. The phrase "fourth generation (4G)", as used herein, refers to fourth generation wireless telephone technology. In this scenario, the communication device 100 can support various 2G data services (e.g., text messaging), 3G data services (e.g., video calls) and/or 4G data services (e.g., ultra-broadband internet access). Embodiments of the present invention are not limited in this regard.

The communication device 100 can employ a single communication protocol or multiple communication protocols. For example, if the communication device 100 is an LMR radio, then it can employ one or more of the following communication protocols: a Terrestrial Trunked Radio (TETRA) transport protocol; a P25 transport protocol; an OPENSKY® protocol; and an Enhanced Digital Access Communication System (EDACS) protocol. If the communication device 100 is a cellular phone, then it can employ one or more of the following communication protocols: a Wideband Code Division Multiple Access (WCDMA) based protocol; a Code Division Multiple Access (CDMA) based protocol; a Wireless Local Area Network (WLAN) based protocol; an Enhanced Data rates for GSM Evolution (EDGE) network based protocol; and a Long Term Evolution (LTE) network based protocol. Embodiments of the present invention are not limited in this regard.

Figure 2:
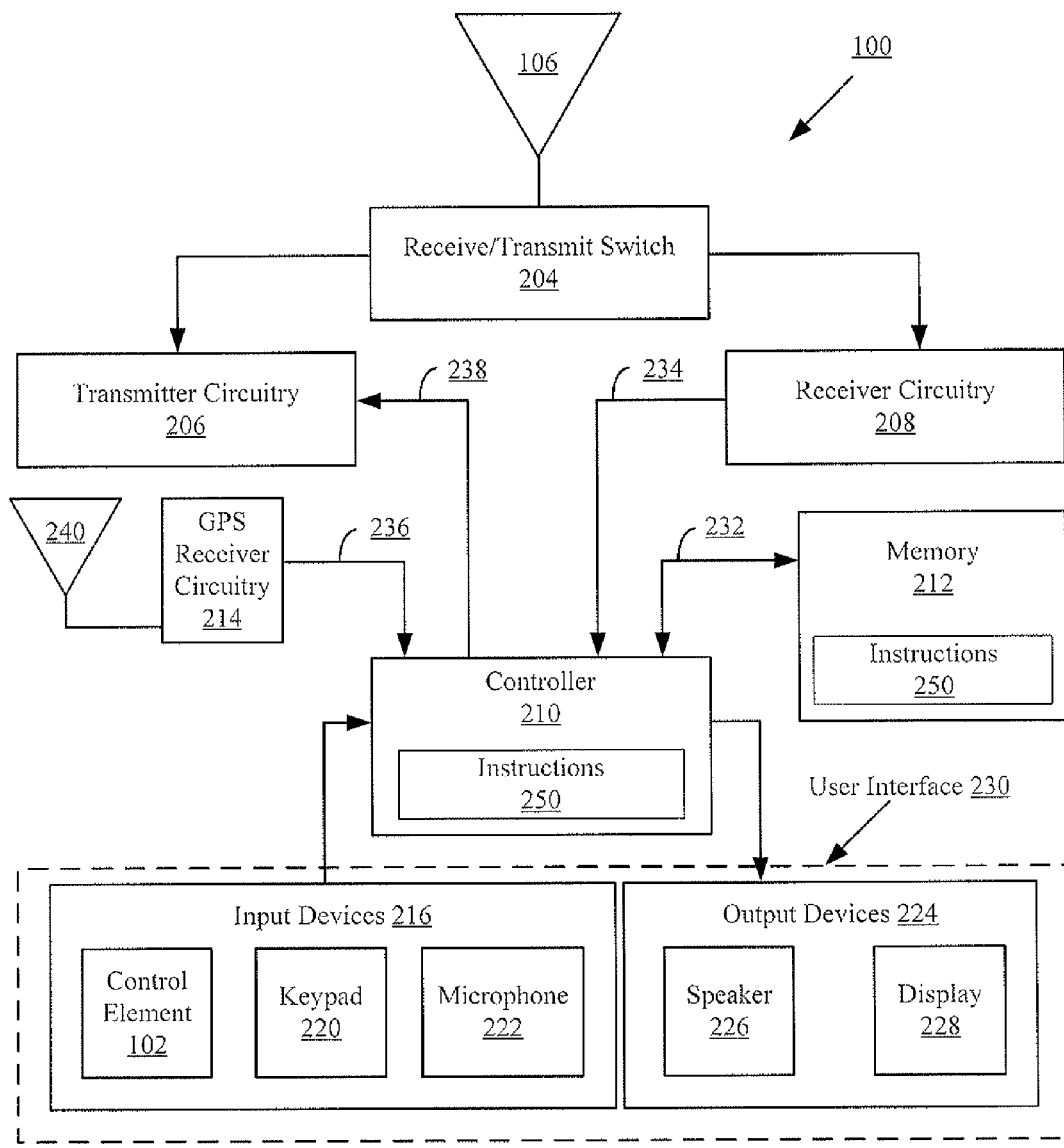
FIG. 2 is a more detailed block diagram of the exemplary communication device shown in FIG. 1 that is useful for understanding the present invention.

A more detailed block diagram of the communication device 100 is provided in FIG. 2. Notably, the communication device 100 may include more or less components than those shown in FIG. 2. However, the components shown are sufficient to disclose an illustrative embodiment implementing the present invention. The hardware architecture of FIG. 2 represents one embodiment of a representative communication device configured to facilitate the provision of a group call service to a user thereof.

As shown in FIG. 2, the communication device 100 comprises an antenna 106 for receiving and transmitting Radio Frequency (RF) signals. A receive/transmit (Rx/Tx) switch 204 selectively couples the antenna 106 to the transmitter circuitry 206 and receiver circuitry 208 in a manner familiar to those skilled in the art. The receiver circuitry 208 demodulates and decodes the RF signals received from a network (not shown in FIG. 2) to derive information therefrom. The receiver circuitry 208 is coupled to a controller 210 via an electrical connection 234. The receiver circuitry 208 provides the decoded RF signal information to the controller 210. The controller 210 uses the decoded RF signal information in accordance with the function(s) of the communication device 100.

The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device (e.g., network equipment not shown in FIG. 2).

An antenna 106 is coupled to Global Positioning System (GPS) receiver circuitry 214 for receiving GPS signals. The GPS receiver circuitry 214 demodulates and decodes the GPS signals to extract GPS location information therefrom. The GPS location information indicates the location of the communication device 100. The GPS receiver circuitry 214 provides the decoded GPS location information to the controller 210. As such, the GPS receiver circuitry 214 is coupled to the controller 210 via an electrical connection 236. The controller 210 uses the decoded GPS location information in accordance with the function(s) of the communication device 100.

The controller 210 stores the decoded RF signal information and the decoded GPS location information in a memory 212 of the communication device 100. Accordingly, the memory 212 is connected to and accessible by the controller 210 through an electrical connection 232. The memory 212 may be a volatile memory and/or a non-volatile memory. For example, the memory 212 can include, but is not limited to, a Random Access Memory (RAM), a Dynamic Random Access Memory (DRAM), a Static Random Access Memory (SRAM), Read-Only Memory (ROM) and flash memory.

As shown in FIG. 2, one or more sets of instructions 250 are stored in the memory 212. The instructions 250 can also reside, completely or at least partially, within the controller 210 during execution thereof by the communication device 100. In this regard, the memory 212 and the controller 210 can constitute machine-readable media. The term "machine-readable media", as used here, refers to a single medium or multiple media that store the one or more sets of instructions 250. The term "machine-readable media", as used here, also refers to any medium that is capable of storing, encoding or carrying the set of instructions 250 for execution by the communication device 100 and that cause the communication device 100 to perform one or more of the methodologies of the present disclosure.

The controller 210 is also connected to a user interface 230. The user interface 230 is comprised of input devices 216, output devices 224, and software routines (not shown in FIG. 2) configured to allow a user to interact with and control software applications (not shown in FIG. 2) installed on the computing device 100. Such input and output devices respectively include, but are not limited to, a display 228, a speaker 226, a keypad 220, a directional pad (not shown in FIG. 2), a directional knob (not shown in FIG. 2), a microphone 222 and a control element (e.g., a PTT button or switch) 102. The display 228 may be designed to accept touch screen inputs.

The user interface 230 is operative to facilitate a user-software interaction for launching group call applications (not shown in FIG. 2), PTT call applications (not shown in FIG. 2), social media applications, internet applications and other types of applications installed on the computing device 100. The group call and PTT call applications (not shown in FIG. 2) are operative to provide a group call service to a user of the communication device 100.

According to one embodiment of the present invention, the control element 102 is configured to function as a PTT switch. As such, the control element 102 provides a user with a single switch or button to initiate a call application. For example, the call application can be initiated in response to a depression of a center of the control element 102. The call application facilitates the provision of a call service to a user of the communication device 100. As such, the call application is operative to perform communication operations. The communication operations can include, but are not limited to, message generation operations, message communication operations, voice packet recording operations, voice packet queuing operations and voice packet communication operations.

The control element 102 is advantageously configured as a multi-function device for controlling various operations other than PTT functions. As such, the control element 102 has various switch positions that can be used for controlling these various other operations. For example, the control element 102 provides the user with a secondary switch or button means for selecting and/or controlling particular functions of the communication device 100. More particularly, a function of the communication device 100 is controlled by the control element 102 in response to the depression of a peripheral edge portion thereof for a pre-defined period of time (e.g., less than or greater than two seconds). The function can include, but is not limited to, an audio volume function, a channel selection function, a mute function, a brightness selection function, an "on/off" function, a play function, a rewind function, a fast forward function, a pause function, a channel recall function, a camera function, a talk group selection function, a media profile selection function, an emergency call function, a map selection function, a priority selection function and a user selection function. Embodiments of the present invention are not limited in this regard.

The control element 102 further provides a rotatable means for selecting and/or controlling particular functions of the communication device 100. For example, a particular function of the communication device 100 is controlled by the control element 102 in response to the rotation of the control element 102 around a central axis thereof. The function can include, but is not limited to, an audio volume function, a channel selection function, a mute function, a brightness selection function, an "on/off" function, a play function, a rewind function, a fast forward function, a pause function, a channel recall function, a camera function, a talk group selection function, an emergency call function, a map selection function, a priority selection function, a user interface selection function and a media profile selection function. Embodiments of the present invention are not limited in this regard. An exemplary embodiment of the control element 102 will now be described in relation to FIG. 3.

Figure 3:
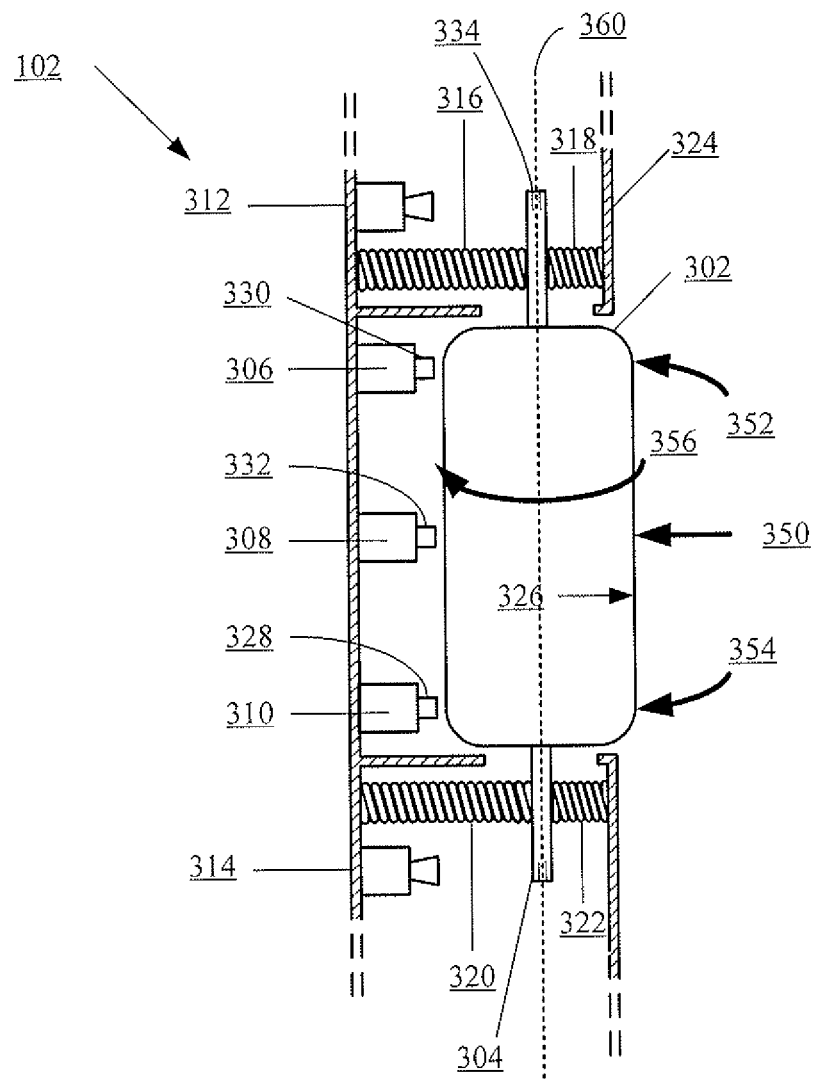
FIG. 3 is schematic illustration of an exemplary embodiment of a control element that is useful for understanding the present invention.

Referring now to FIG. 3, there is provided a schematic illustration of an exemplary embodiment of control element 102 that is useful for understanding the present invention. It should be understood that there are numerous ways of implementing the control element 102. As such, the present invention is not limited to the specific arrangement shown in FIG. 3.

As shown in FIG. 3, the control element 102 includes an elongated roller 302, a shaft 304, switches 306, 308, 310, optical position detectors 312, 314, and resilient members 316, 318, 320, 322. The elongated roller 302 is disposed in the housing 104 of a communication device 100 so as to at least partially project outward therefrom. In this way, the elongated roller 302 is easily accessible to a user of the communication device 100. However, embodiments of the present invention are not limited in this regard. For example, the elongated roller 302 can alternatively be recessed or flush with a surface of the housing 104.

According to one aspect of the present invention, the elongated roller 302 has a generally cylindrical form. As such, the elongated roller 302 advantageously is arranged so that it is somewhat elongated along the length of its central axis 360. In some embodiments, the elongated roller 302 can have a form that deviates somewhat from a conventional cylindrical shape. Thus, for example, the elongated roller 302 can have convex or concave sides. Also, the surface of the elongated roller 302 can be smooth or knurled.

The elongated roller 302 is configured to be transitioned from a rest position shown in FIG. 3 to a plurality of actuated positions, such as those shown in FIGS. 4-7. In each of the actuated positions, a particular function of the communication device 100 is selected or controlled. According to one embodiment, shaft 304 or elongated roller 302 can be guided within a channel (not shown in FIG. 3) formed in the housing 104 of a communication device 100.

Figure 4:
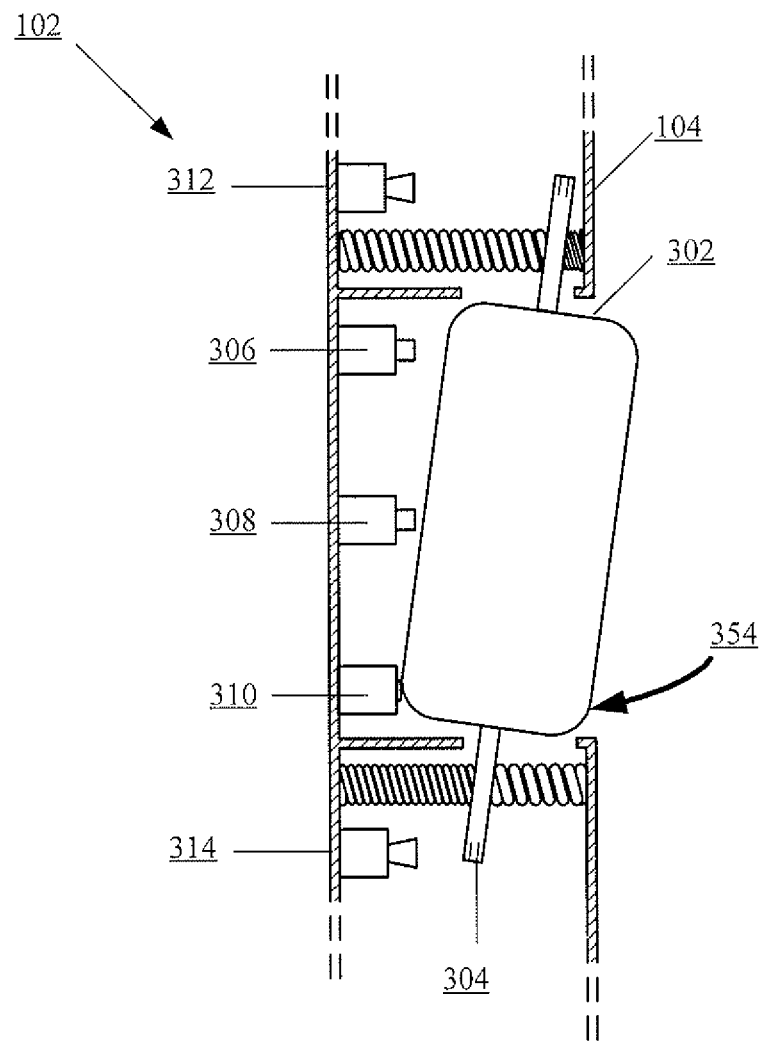
FIG. 4 is a schematic illustration showing the control element of the communication device of FIG. 3 in a first actuated position.

The elongated roller 302 can be transitioned from the rest position shown in FIG. 3 to a first actuated position shown in FIG. 4 for controlling a particular function of the communication device. As shown in FIG. 4, the position transition can be achieved by depressing a bottom peripheral edge portion 354 of an exposed surface 326 of the elongated roller 302 for a short period of time (e.g., less than two seconds) or a long period of time (e.g., greater than two seconds). In the first actuated position, an actuator 328 of the switch 310 is depressed by the elongated roller 302 as shown in FIG. 4. As a result of the depression of the actuator 328, the switch 310 is placed in a closed or open position so as to indicate that the elongated roller 302 is in the first actuated position. In some embodiments, the communication device 100 performs operations to: (a) track the amount of time the elongated roller 302 is depressed; and (b) change an operational parameter of the communication device 100 based on the duration of the button depression.

Figure 5:
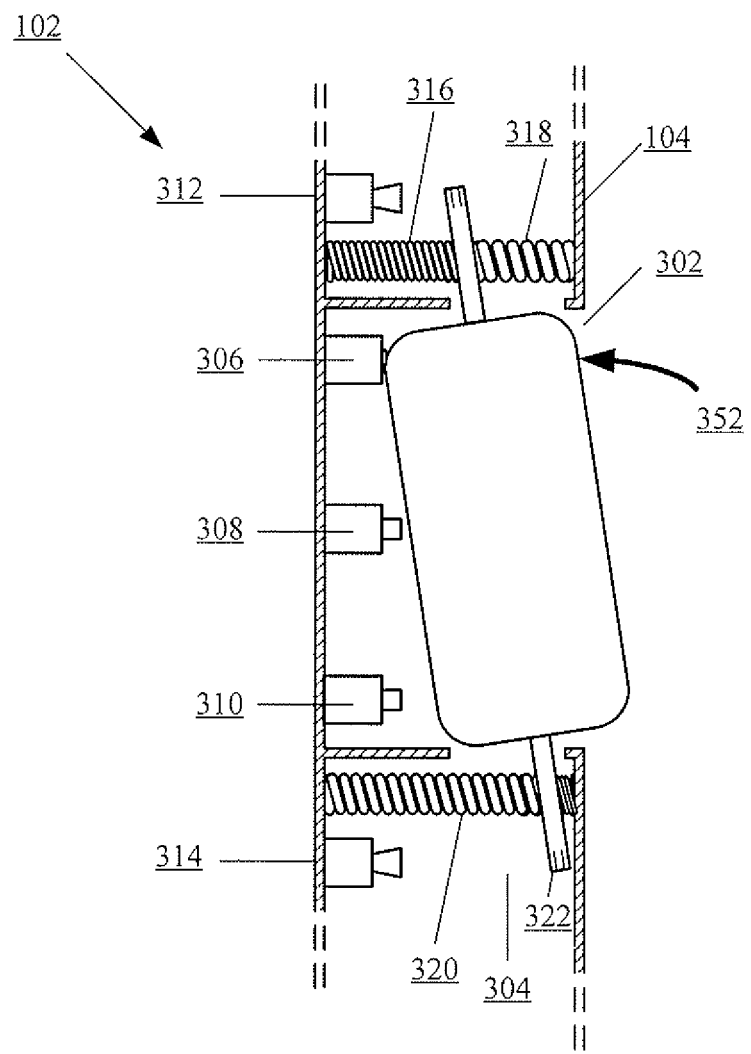
FIG. 5 is a schematic illustration showing the control element of the communication device of FIG. 3 in a second actuated position.

Similarly, the elongated roller 302 is configured to be transitioned from the rest position shown in FIG. 3 to a second actuated position shown in FIG. 5 for controlling a particular function of the communication device 100. As shown in FIG. 5, the position transition can be achieved by depressing a top peripheral edge portion 352 of an exposed surface 326 of the elongated roller 302 for a short period of time (e.g., less than two seconds) or a long period of time (e.g., greater than two seconds). In the second actuated position, an actuator 330 of the switch 306 is depressed by the elongated roller 302 as shown in FIG. 5. As a result of depression of the actuator 330, the switch 306 is placed in a closed or open position so as to indicate that the elongated roller 302 is in the second actuated position. In some embodiments, the communication device 100 performs operations to: (a) track the amount of time the elongated roller 302 is depressed; and (b) change an operational parameter of the communication device 100 based on the duration of the button depression.

Figure 6:
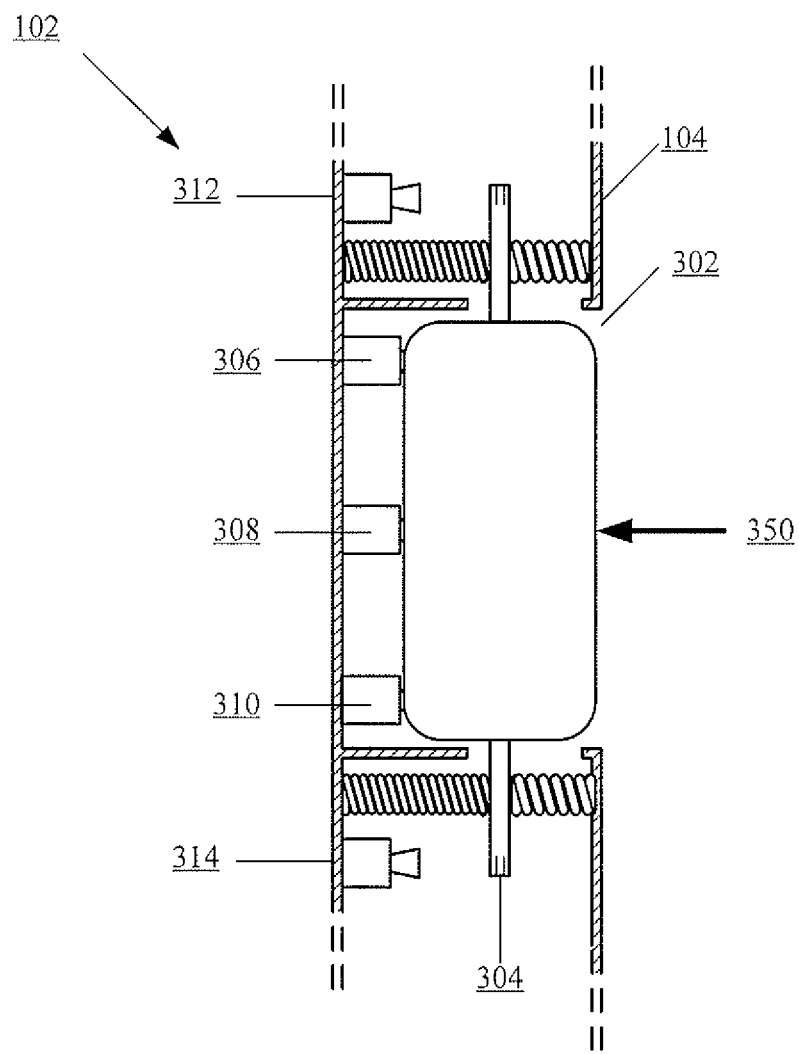
FIG. 6 is a schematic illustration showing the control element of the communication device of FIG. 3 in a third actuated position.

The elongated roller 302 can also be transitioned from the rest position shown in FIG. 3 to a third actuated position shown in FIG. 6 for controlling a particular function of communication device 100. As shown in FIG. 6, the position transition can be achieved by depressing a center portion 350 of an exposed surface 326 of the elongated roller 302. In the third actuated position, the actuators 328, 330, 332 of the switches 306, 308, 310 are depressed by the elongated roller 302 as shown in FIG. 6. As a result of the depression of the actuators 328, 330, 332, the switches 306, 308, 310 are placed in their closed or open positions so as to indicate that the elongated roller 302 is in the third actuated position. In some embodiments, the communication device 100 performs operations to place a call to an individual or members of a selected talk group. The call can be terminated by releasing the elongated roller 302.

Figure 7:
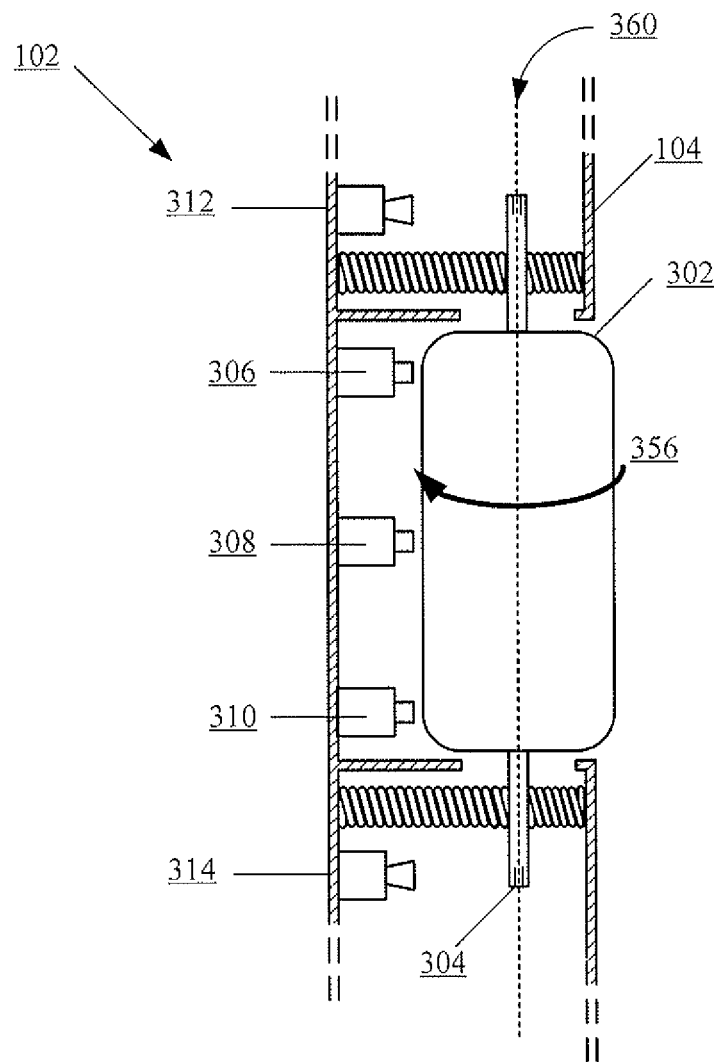
FIG. 7 is a schematic illustration showing the control element of the communication device of FIG. 3 in a fourth actuated position.

The elongated roller 302 can also be transitioned from the rest position shown in FIG. 3 to a fourth position shown in FIG. 7 for selecting or controlling an operational parameter of the communication device 100. As shown in FIG. 7, the position transition can be achieved by rotating the elongated roller 302 around a central axis 360 thereof. According to one embodiment of the present invention, a suitable sensing means can be provided for the detection of such rotation. The sensing means can detect a rate of rotation and/or an amount of rotation by communicating sensor information to the controller 210. The sensing means can be a mechanical sensing means (not shown), an electrical sensing means (not shown), an electro-mechanical sensing means (not shown), or an electro-optical sensing means (shown in FIG. 3). For example, in one embodiment of the present invention, a shaft 304 of the elongated roller 302 has a plurality of scan lines 334 formed on one or more ends thereof. The optical position detector(s) 312, 314 is (are) configured for scanning the scan lines to determine the occurrence of button rotation from the rest position (shown in FIG. 3). The information is provided to controller 210 to evaluate the amount and/or rate of rotation. Thereafter, the communication device 100 performs operations to change an operational parameter of the communication device 100 based on the amount and/or rate of button rotation. It should be noted that there are many known techniques for measuring and/or detecting rotation of a shaft, and any such technique can be used herein without limitation.

As noted above, the elongated roller 302 is configured to be transitioned from a rest position shown in FIG. 3 to a plurality of actuated positions, such as those shown in FIGS. 4-7. In each of the actuated positions, a particular function of the communication device 100 is selected or controlled. The particular actuated position can be advantageously detected by the controller 210 that is operatively connected to the control element 102. The controller 210 will then determine a device function or control to be activated based on the switch position. Alternatively or in addition to detecting an actuated position, the controller 210 is advantageously configured to determine a period of time that the control element remains in one or more actuated positions. Alternative control functions can be detected based on such timing information as explained below in further detail. The functions associated with the various actuated positions include, but are not limited to, an audio volume function, a channel selection function, a mute function, a brightness selection function, an "on/off" function, a play function, a rewind function, a fast forward function, a pause function, a channel recall function, a camera function, a talk group selection function, a media profile selection function, an individual call function, a group call function, an emergency call function, a map selection function, a priority selection function, a user interface selection function and a PTT function. Embodiments of the present invention are not limited in this regard.

According to embodiments of the present invention, the control element 102 is disposed in an LMR radio or cellular phone. In this scenario, an audio volume function, a talk group selection function and/or a social media profile selection function is (are) controlled by controller 210 (or other processing device) in response to the depression of the peripheral edge portion 352, 354 of elongated roller 302 for a short period of time (e.g., less than two seconds) or a long period of time (e.g., greater than two seconds). In this regard, controller 210 performs operations to: (a) detect an actuated position of elongated roller 302; (b) track the amount of time the elongated roller 302 is depressed; and (c) change an operational parameter of the communication device based on the particular actuated position of elongated roller 302 and the duration of the button press. The operational parameter includes an audio volume parameter, a talk group parameter and/or a social media profile parameter. Additionally or alternatively, the audio volume function, talk group selection function, and/or the social media profile function is (are) controlled by controller 210 in response to the rotation of the elongated roller 302 around a central axis 360 thereof. In this regard, controller 210 performs operations to change the operational parameter based on the amount and/or rate of rotation of the elongated roller 302. Also in this scenario, a call application is initiated by controller 210 in response to the depression of a center portion 350 of the elongated roller 302. In this regard, controller 210 performs operations to place a call to an individual or members of a selected talk group. The call is terminated in response to a release of the elongated roller 302. Embodiments of the present invention are not limited in this regard.

According to other embodiments of the present invention, the control element 102 is disposed in a television (not shown in FIGS. 1-7) or a television remote controller (not shown in FIGS. 1-7). In this scenario, an audio volume function, a channel selection function, a play function, a rewind function, a fast forward function and/or a pause function is (are) controlled by controller 210 (or other processing device) in response to the depression of the peripheral edge portion 352, 354 of elongated roller 302 for a short period of time (e.g., less than two seconds) or a long period of time (e.g., greater than two seconds). In this regard, controller 210 performs operations to: (a) detect an actuated position of the elongated roller 302; (b) track the amount of time the elongated roller 302 is depressed; and (c) change an operational parameter of the television (not shown in FIGS. 1-7) based on the particular actuated position of elongated roller 302 and duration of the button press. The operational parameter includes an audio volume parameter, a channel parameter, a play parameter, a rewind parameter, a fast forward parameter, and/or a pause parameter. Additionally or alternatively, the audio volume function, channel selection function, play function, rewind function, fast forward function and/or pause function is (are) controlled by controller 210 in response to the rotation of the elongated roller 302 around a central axis 360 thereof. In this regard, controller 210 performs operations to change the operational parameter based on the amount and/or rate of rotation of the elongated roller 302. Also in this scenario, an "on/off" function, a mute function, or a channel recall function of the television (not shown in FIGS. 1-7) is controlled by controller 210 in response to the depression of a center portion 350 of the elongated roller 302. In this regard, controller 210 performs operations to turn the television (not shown in FIGS. 1-7) on or off, mute an audio output of the television (not shown in FIGS. 1-7) or change a channel to a previously selected channel. Embodiments of the present invention are not limited in this regard.

Figure 8:
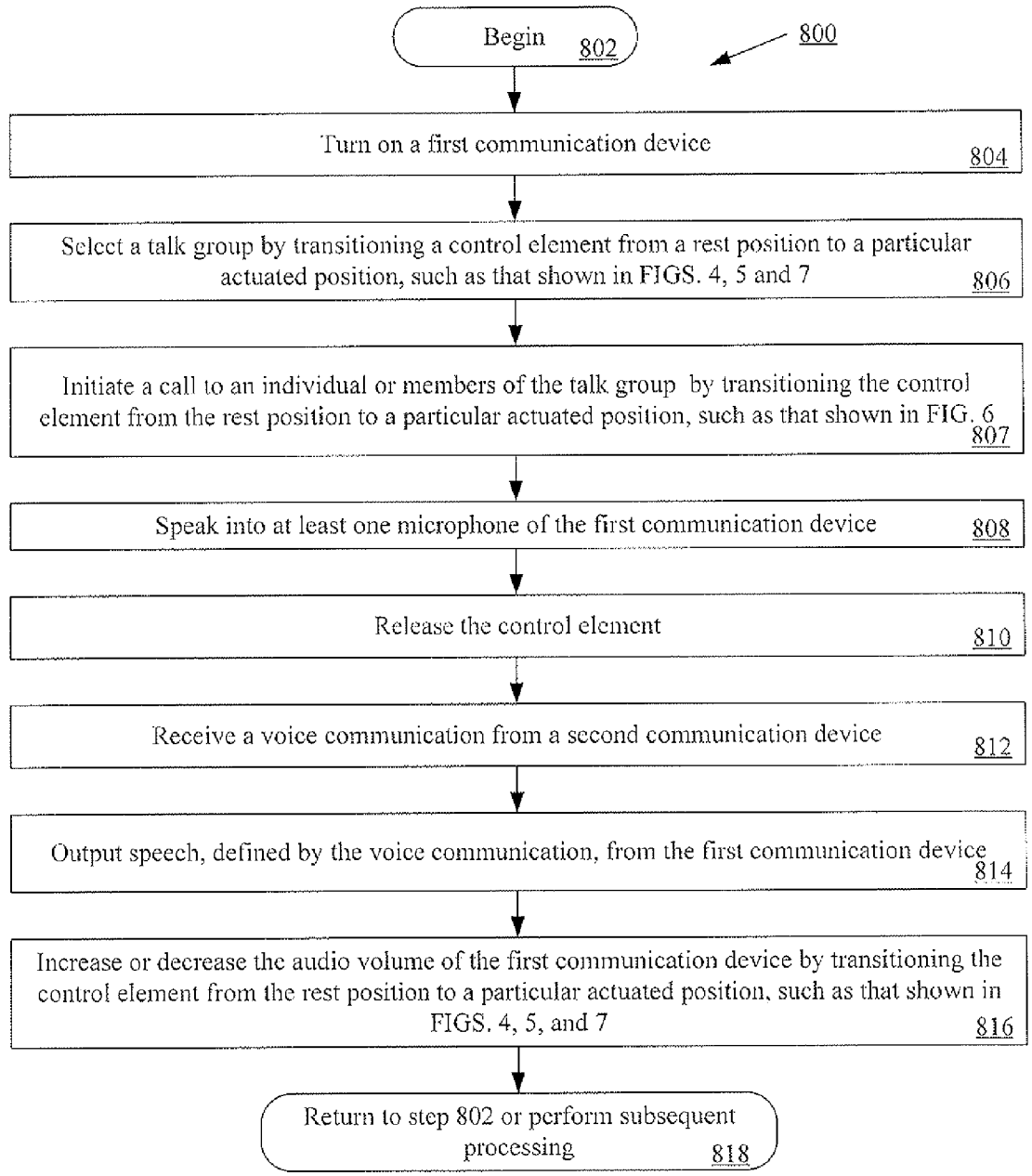
FIG. 8 is a flow diagram of an exemplary method for controlling a radio transceiver of a communication device that is useful for understanding the present invention.

Referring now to FIG. 8, there is provided a flow diagram of an exemplary method 800 for controlling a radio transceiver of a communication device (e.g., the communication device 100 of FIG. 1) that is useful for understanding the present invention. As shown in FIG. 8, the method 800 begins with step 802 and continues with step 804 where the communication device (e.g., communication device 100 of FIG. 1) is turned on.

In a next step 806, a talk group is selected using a control element (e.g., the control element 102 of FIG. 1 or the control element 300 of FIG. 3). For example, the talk group can be selected by transitioning the control element from a rest position to a particular actuated position, such as that shown in FIGS. 4, 5 and 7. As shown in FIG. 4, the position transition of the control element can be achieved by depressing a bottom peripheral edge portion 354 of an exposed surface 326 of the elongated roller 302 for a short period of time (e.g., less than two seconds) or a long period of time (e.g., greater than two seconds). As shown in FIG. 5, the position transition of the control element 300 can be achieved by depressing a top peripheral edge portion 352 of the exposed surface 326 of the elongated roller 302 for a short period of time (e.g., less than two seconds) or a long period of time (e.g., greater than two seconds). As shown in FIG. 7, the position transition of the control element 300 can be achieved by rotating the elongated roller 302 around a central axis 360 thereof.

Referring again to FIG. 8, the method 800 continues with step 807 where a call is initiated to an individual or members of the selected talk group. The call initiation and channel resource allocation can be accomplished by transitioning the control element from the rest position to a particular actuated position, such as that shown in FIG. 6. As shown in FIG. 6, the position transition is achieved by depressing a center portion 350 of an exposed surface 326 of the elongated roller 302.

After initiating the call, step 808 is performed where the user of the communication device (e.g., communication device 100 of FIG. 1) speaks into one or more microphones thereof. In effect, speech signals are received at the communication device (e.g., communication device 100 of FIG. 1). The communication device (e.g., communication device 100 of FIG. 1) processes the speech signals to generate voice packets. The voice packets are then communicated from the communication device (e.g., communication device 100 of FIG. 1) to one or more other communication devices via a network. The communication devices can be members of the selected talk group.

In a next step 810, the user of the communication device (e.g., communication device 100 of FIG. 1) releases the control element. Consequently, the call remains open for another speech item request by a member of a group call or a member of an individual call until the call is terminated by expiration of one or more call timers or when the call is closed by the call initiator or one of the call members.

When the control element is released from the communication device (e.g., communication device 100 of FIG. 1), it can receive a voice communication from a second communication device in step 812. Thereafter, step 814 is performed where speech is output from the communication device (e.g., communication device 100 of FIG. 1). The speech is defined by the voice communication received in the previous step 812.

In a next step 816, an audio volume is increased or decreased by transitioning the control element from a rest position to a particular actuated position, such as that shown in FIGS. 4, 5 and 7. As shown in FIG. 4, the position transition of the control element can be achieved by depressing a bottom peripheral edge portion 354 of an exposed surface 326 of the elongated roller 302 for a short period of time (e.g., less than two seconds) or a long period of time (e.g., greater than two seconds). As shown in FIG. 5, the position transition of the control element 300 can be achieved by depressing a top peripheral edge portion 352 of the exposed surface 326 of the elongated roller 302 for a short period of time (e.g., less than two seconds) or a long period of time (e.g., greater than two seconds). As shown in FIG. 7, the position transition of the control element 300 can be achieved by rotating the elongated roller 302 around a central axis 360 thereof.

Subsequent to completing step 816, step 818 is performed where the method 800 returns to step 802 or other processing is performed by the communication device (e.g., communication device 100 of FIG. 1).

As evident from the above discussion, the present invention provides communication devices with certain advantages over conventional communication devices. For example, a plurality of actions or functions of a communication device can be selected or controlled using the single control element of the present invention. In effect, a user only needs one hand to hold the communication device and change functional settings thereof through the single control element of the present invention. The control elements of the present invention advantageously facilitate the decrease in overall sizes of communication devices. The relatively small sized communication devices of the present invention are less expensive to manufacture as compared to conventional communication devices including a plurality of rotary knobs and buttons for controlling functions thereof.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for controlling a radio transceiver, comprising:
controlling a first function of said radio transceiver in response to an actuation of at least a first switch by a depression of a center of an elongated roller of a control element, said first switch disposed adjacent to said center of said elongated roller;
controlling a second function of said radio transceiver in response to an actuation of a second switch by a depression of a first peripheral edge portion of said elongated roller for a first period of time, said second switch disposed adjacent to a first end of said elongated roller;
controlling a third function of said radio transceiver in response to an actuation of a third switch by a depression of a second peripheral edge portion of said elongated roller for a second period of time, said second peripheral edge portion opposed from said first peripheral edge portion, and said third switch disposed adjacent to a second end opposed from said first end of said elongated roller; and
controlling a fourth function of said radio transceiver in response to a rotation of said elongated roller around a central axis of said elongated roller.

2. The method according to claim 1, further comprising controlling a fifth function of said radio transceiver in response to a depression of said first peripheral edge portion for a third period of time that is longer than said first period of time.

3. The method according to claim 1, further comprising controlling a fifth function of said radio transceiver in response to a depression of said second peripheral edge portion for a third period of time that is longer than said second period of time.

4. The method according to claim 1, further comprising changing an operational parameter of said radio transceiver based on a rotation of said elongated roller around said central axis.

5. The method according to claim 4, wherein said operational parameter is selected from the group consisting of a talk group parameter and an audio volume parameter.

6. The method according to claim 1, further comprising selecting at least one of said first, second, third and fourth functions from the group consisting of an audio volume function, a channel selection function, a mute function, a brightness selection function, an "on/off" function, a play function, a rewind function, a fast forward function, a pause function, a channel recall function, a camera function, a talk group selection function, a media profile selection function, an individual call function, a group call function, an emergency call function, a map selection function, a priority selection function, a user interface selection function and a PTT function.

7. An apparatus for controlling a device, comprising:
an elongated control element comprising an elongated roller; and
at least one controller operable with said elongated roller and configured to:
(a) control a first function of said device in response to an actuation of at least a first switch by a depression of a center of said elongated roller, said first switch disposed adjacent to a first end of said elongated roller;
(b) control a second function of said device in response to an actuation of a second switch by a depression of a first peripheral edge portion of said elongated roller for a first period of time, said second switch disposed adjacent to a first end of said elongated roller;
(c) control a third function of said device in response to an actuation of a third switch by a depression of a second peripheral edge portion of said elongated roller for a second period of time, said second peripheral edge portion opposed from said first peripheral edge portion, and said third switch disposed adjacent to a second end opposed from said first end of said elongated roller; and
(d) control a fourth function of said device in response to a rotation of said elongated roller around a central axis of said elongated roller.

8. The apparatus according to claim 7, wherein said controller is further configured to control a fifth function of said device in response to a depression of said first peripheral edge portion for a third period of time that is longer than said first period of time.

9. The apparatus according to claim 7, wherein said controller is further configured to control a fifth function of said device in response to a depression of said second peripheral edge portion for a third period of time that is longer than said second period of time.

10. The apparatus according to claim 7, wherein said controller is further configured to change an operational parameter of said device responsive to a rotation of said elongated roller around said central axis.

11. The apparatus according to claim 10, wherein said operational parameter is selected from the group consisting of a talk group parameter and an audio volume parameter.

12. The apparatus according to claim 7, wherein at least one of said first, second, third and fourth functions is selected from the group consisting of an audio volume function, a channel selection function, a mute function, a brightness selection function, an "on/off" function, a play function, a rewind function, a fast forward function, a pause function, a channel recall function, a camera function, a talk group selection function, a media profile selection function, an individual call function, a group call function, an emergency call function, a map selection function, a priority selection function, a user interface selection function and a PTT function.

13. The apparatus according to claim 7, wherein said device is selected from the group consisting of a radio, a mobile phone, a cellular phone, a personal digital assistant, a global positioning device, a personal computer, a television and a vehicular communication device.

14. A system for controlling a radio transceiver device, comprising:
an elongated control element comprising an elongated roller; and
at least one controller operable with said elongated roller and configured to
(a) select a talk group or social media profile in response to a rotation of said elongated roller around a central axis of said elongated control element,
(b) initiate a call to members of said selected talk group or social media profile in response to an actuation of at least a first switch by a depression of a center of said elongated roller, and (c) control an audio volume of said radio transceiver device in response to an actuation of second switch by a depression of a first peripheral edge portion of said elongated roller for a first period of time.

15. The system according to claim 14, wherein said controller is further configured to control said audio volume of said radio transceiver device in response to a depression of said first peripheral edge portion of said elongated roller for a second period of time that is longer than said first period of time.

16. The system according to claim 14, wherein said controller is further configured to control said audio volume of said radio transceiver device in response to a depression of a second peripheral edge portion of said elongated roller for a second period of time, said second peripheral edge portion opposed from said first peripheral edge portion.

17. The system according to claim 16, wherein said controller is further configured to control said audio volume of said radio transceiver device in response to a depression of a second peripheral edge portion of said elongated roller for a third period of time that is longer than said second period of time.

18. The system according to claim 14, wherein said controller is further configured to change an operational parameter of said radio transceiver device responsive to a rotation of said elongated roller.

19. The system according to claim 18, wherein said operational parameter is selected from the group consisting of a talk group parameter and an audio volume parameter.

20. The system according to claim 14, wherein said radio transceiver device is selected from the group consisting of a radio, a mobile phone, a cellular phone, a personal digital assistant, a global positioning device, a personal computer, a television and a vehicular communication device.

21. A radio transceiver, comprising;
a Push-To-Talk (PTT) switch comprising an elongated roller; and
at least one controller operable with said elongated roller and configured to
select a talk group in response to a rotation of said elongated roller around a central axis of said elongated roller, and
initiate a PTT call to members of said selected talk group in response to an actuation of at least a first switch by a depression of a center of said elongated roller, said first switch disposed adjacent to said center of said elongated roller.

22. The radio transceiver according to claim 21, wherein said controller is further configured to control an audio volume of said radio transceiver in response to a depression of a peripheral edge portion of said elongated roller for a predefined period of time.

23. The radio transceiver according to claim 21, wherein said controller is further configured to change a talk group parameter of said radio transceiver based on an amount of rotation of said elongated roller from a rest position.

24. The radio transceiver according to claim 21, wherein said radio transceiver is selected from the group consisting of a radio, a mobile phone, a cellular phone, a personal digital assistant, a personal computer and a vehicular communication device.

* * * * *